(12) United States Patent
Shah

(10) Patent No.: US 12,452,526 B1
(45) Date of Patent: Oct. 21, 2025

(54) SYSTEMS AND METHODS FOR DIGITAL MEDIA CREATION WITH AUTOMATED FILE MANAGEMENT

(71) Applicant: Nishant Shah, Aurora, IL (US)

(72) Inventor: Nishant Shah, Aurora, IL (US)

( * ) Notice: Subject to any disclaimer, the term of this patent is extended or adjusted under 35 U.S.C. 154(b) by 0 days.

(21) Appl. No.: 18/970,886

(22) Filed: Dec. 5, 2024

(51) Int. Cl.
*H04N 23/63* (2023.01)
*G06F 3/0482* (2013.01)
*G06F 3/0484* (2022.01)
*G06F 3/0488* (2022.01)
*H04N 23/62* (2023.01)

(52) U.S. Cl.
CPC ......... *H04N 23/632* (2023.01); *G06F 3/0482* (2013.01); *G06F 3/0484* (2013.01); *G06F 3/0488* (2013.01); *H04N 23/62* (2023.01)

(58) Field of Classification Search
CPC .... H04N 23/632; H04N 23/62; G06F 3/0482; G06F 3/0484; G06F 3/0488
See application file for complete search history.

(56) References Cited

U.S. PATENT DOCUMENTS

| | | | |
|---|---|---|---|
| 2005/0108253 A1* | 5/2005 | Metsatahti | G06F 16/54 |
| 2005/0149571 A1* | 7/2005 | Jeon | H04N 1/2112 |
| 2007/0185936 A1* | 8/2007 | Derk | G06F 16/51 |
| | | | 707/E17.031 |
| 2011/0314401 A1* | 12/2011 | Salisbury | H04N 23/62 |
| | | | 715/771 |

* cited by examiner

*Primary Examiner* — Christopher K Peterson
(74) *Attorney, Agent, or Firm* — The Law Offices of Konrad Sherinian, LLC; Jeffrey S. Dixon

(57) ABSTRACT

A mobile app based digital media recording system that integrates an automated file organization system. Digital media (video, photo, audio) files are organized into albums. A logical pin is applied to one of the albums (a "pinned" album) at all times. Newly recorded files are automatically stored in the pinned album. The pin has an associated timer, which expires by default at the end of a current calendar day whenever the pin is moved to an album, and a user can reset the pin timer manually. A new empty album is automatically created and pinned whenever the pin timer expires. Album views in a file gallery include album-specific add/append content controls. When activated, the add content control opens a camera interface, and the pin moves to the corresponding album if it is not already pinned. At the end of each calendar day, empty albums are automatically deleted.

3 Claims, 14 Drawing Sheets

SYSTEMS AND METHODS FOR DIGITAL MEDIA CREATION WITH AUTOMATED FILE MANAGEMENT

CROSS REFERENCE

None.

FIELD OF THE DISCLOSURE

The present disclosure relates to electronic media file creation and management systems and methods, and more particularly, to systems and methods for recording, organizing, customizing, and editing visual and audiovisual media.

BACKGROUND

Since the advent of smartphones, with built-in cameras and access to practically limitless internal and/or remote networked ("cloud") data storage, it has become increasingly easy and convenient for a person or organization to amass daunting numbers of digital media files, particularly videos and photos. So much so that organizing one's digital media library is often a daunting task that users often undertake sporadically and haphazardly, if at all. Some users create folders intended to store media files associated with places, people or events, often forgetting that a folder associated with a particular event already exists, and/or neglecting to store files in a folder intended for those files. Later, the users waste time browsing or searching empty or underutilized folders in search of the files they meant to store in those folders, which are either in another redundant folder or in an uncategorized default storage location, where the bulk of the user's files may typically end up. Other users opt to forgo organization completely, leaving entire libraries of videos and photos captured by their cameras in a single default system folder, requiring those users to browse through a large number of ungrouped files, in search of a particular file, or chronologically scattered files related to a particular subject.

Accordingly, a need exists for systems and methods for media file creation that facilitate organization of the files into folders by subject matter, while avoiding or reducing the occurrence of unused and/or redundant folders.

SUMMARY

According to an aspect of the disclosure a digital media file recording and organization system comprises a recording component, a processor, a storage, a software application, and a display. The recording component is operative to record audiovisual content comprising at least one of images and sound, to generate digital media data from the recorded audiovisual content, the digital media data comprising at least one of digital image data representing recorded images and digital audio data representing recorded sound. The processor is operatively connected to the recording component to read the digital media data from the recording component. The storage comprises a non-volatile computer-readable medium adapted and configured to store a plurality of digital media files, each digital media file comprising at least a portion of the digital media data read from the recording component, the processor being operatively connected to the storage to write the digital media files to the storage and to read the digital media files from the storage. The software application comprises computer readable instructions stored in the storage, the processor being operative to read and execute the instructions from the storage. The processor is operatively connected to the display, the software application including instructions for the processor to display a user interface on the display. The user interface comprises interactive user interface views, and the display comprises a touchscreen, the touchscreen being operative to detect user touch inputs and to generate user input data from the user touch inputs, the processor being operatively connected to the touchscreen to read the user input data from the touchscreen. The software application includes instructions for the processor to display a recording interface on the display, the recording interface comprising a record control and a file navigation link. The software application further includes instructions for the processor to:

activate the recording component to begin recording said audiovisual content to generate said digital media data when the record control is activated a first time by a user touch input on the touchscreen, and when the record control is so activated a second time, stop said recording and write to the storage a digital media file containing the digital media data generated during said recording;

display a file navigation interface on the display when the file navigation link is activated, the file navigation interface including at least an album listing view, the album listing view displaying a plurality of album areas representing a corresponding plurality of albums, each of the albums being a logical entity stored in the storage, the logical entity being configured to logically contain zero or more of the digital media files stored in the storage;

delete any empty album, that is, an album that contains no digital media files, subject to one or more further conditions for the deletion of an empty album.

BRIEF DESCRIPTION OF THE DRAWINGS

Although the characteristic features of this disclosure will be particularly pointed out in the claims, the disclosed method and system, and how it may be made and used, may be better understood by referring to the following description taken in connection with the accompanying drawings forming a part hereof, wherein like reference numerals refer to like parts throughout the several views and in which:

A person of ordinary skill in the art will appreciate that elements of the figures above are illustrated for simplicity and clarity and are not necessarily drawn to scale. The dimensions of some elements in the figures may have been exaggerated relative to other elements to help to understand the present teachings. Furthermore, a particular order in which certain elements, parts, components, modules, steps, actions, events and/or processes are described or illustrated may not be required. A person of ordinary skill in the art will appreciate that, for simplicity and clarity of illustration, some commonly known and well-understood elements that are useful and/or necessary in a commercially feasible embodiment may not be depicted to provide a clear view of various embodiments per the present teachings.

DETAILED DESCRIPTION

In the following description of exemplary systems and methods embodying aspects of the disclosure, reference is made to the accompanying drawings, which form a part hereof, and in which are shown by way of illustration various example devices, systems, and environments in which aspects of the disclosed system and method can be practiced. Other specific arrangements of parts, example devices, systems, and environments, can be used, and structural modifications and functional modifications can be made without departing from the scope of the disclosed system and method.

Disclosed herein are systems and methods for integrated electronic file creation and organization. More particularly, in the embodiments described and illustrated herein, the electronic files are digital media files (photos and videos, with or without sound). The systems and methods are typically implemented by a software application, "app," or where applicable "mobile app," executed on an electronic computing system (typically that of a smartphone), which is operatively connected to a video camera (or "camera"). The computing system includes a processor, a memory, a user output device (which is shown as a display in the illustrated embodiments but may be or also include a speaker) and a user input device (shown as a touchscreen, but may be or also include a microphone and/or hard buttons). The camera includes a lens, an image sensor, and a video processor. The computing system and the camera can be integrated into a single housing or enclosure, such as that of a smartphone or other small, handheld electronic device. However, it should be understood that the principles of the interface can easily be used on other types of devices as well, such as digital camcorders, digital cameras, or remote-control software operating on a computer or other device to control a remotely located camera, which comprises at least lens and a sensor located in a separate enclosure from the computer.

Physical System Components

Figure 1:
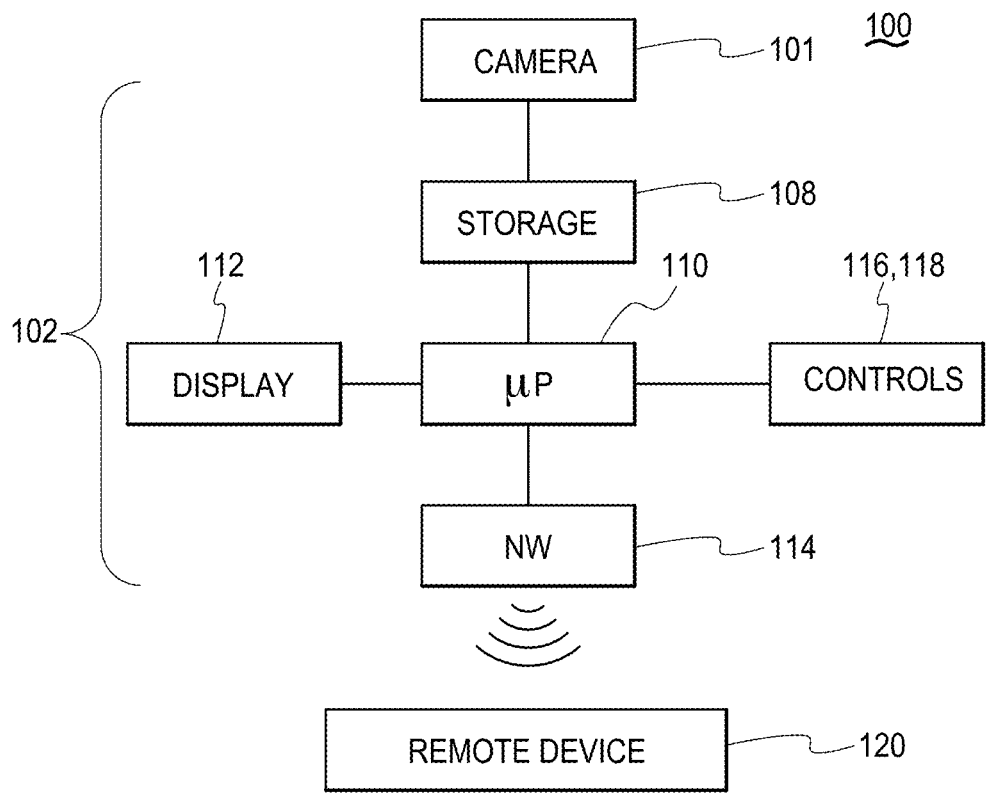
FIG. 1 is a simplified block diagram of a system for digital media creation and file management according to an embodiment.

Shown in FIG. 1 is a simplified block diagram illustrating the general construction of a recording and file management system 100 according to embodiments of the disclosure. The recording system 100 includes a recording component 101 (which is depicted as a "CAMERA" block and is alternately referred to herein as a camera 101, but which can instead or additionally comprise a microphone), which typically comprises a camera including at least an image sensor and a lens that focuses light on the image sensor; a storage 108, a processor 110, a display 112, controls including manual controls 116 and automatic controls 118, a network interface 114, and optionally a remote device 120. In embodiments, the camera 101, storage 108, processor 110, display 112, controls 116 and 118, and network interface 114 are comprised in a recording device 102 (alternately referred to as a camera device 102, as depicted in FIGS. 2-11). Typically, the output of an image sensor will be processed by a video processor (which may be the central processor of an electronic device that includes the camera, or it may be a separate video processor, such as the processor 110), which will process the video from the image sensor and write or commit full frames of video to storage 108. The video processor may process data from the image sensor at a frame rate. In embodiments, a video processor that is separate from the processor 110 writes frame data directly to storage 108 via a DMA channel. In other embodiments, the processor 110 reads data from the video processor (or directly from the image sensor, in which case a video processor can be omitted) and writes the frame data to storage 108.

The storage 108 used by the recording system 100 can be any suitable type of non-volatile memory device, having a write speed that is sufficient for the frame rate at which the recording system 100 is operated.

During recording of video, the processor 110 reads frame data from storage 108 or directly from an image sensor or video processor of the camera 101 and displays it in real time on the display 112. The processor 110 also performs housekeeping activities, such as configuring the video processor if any, accepting manual controls 116 and automatic controls 118, and interfacing with one or more remote devices 120 via the network interface 114.

The display 112 can be, for example, a Liquid Crystal Display (LCD), an LED or an OLED display, or another type of display, and is of sufficient resolution and refresh rate for the video camera operator to view and monitor the scene that is being recorded. In certain implementations, the display 112 can be a touchscreen.

As mentioned above, controls of the recording system 100 can include both manual controls 116 and automatic controls 118. Manual controls 116 are components that receive and transmit manual user inputs to the processor 110, while automatic controls 118 are components that automatically generate and transmit inputs to the processor 110.

Manual user inputs to the processor 110 allow the camera operator to control the operation of the recording system 100. The manual controls 116 can include, for example, a touch screen system, or a collection of buttons, sliders, joysticks, gesture controls, voice controls, and other input control components, as are typical in video camera systems.

The automatic controls 118 transmit inputs automatically to the processor 110, such as geolocation and user activity, as described below. The automatic controls 118 can include, for example, a geolocation component operative to determine the geolocation of a camera device 102, such as a GPS component retained by the camera device 102, a clock, and/or one or more sensors such as a light sensor and/or a motion sensor retained by the camera device 102. For purposes of this disclosure, where not stated otherwise, a "camera device" includes at least a camera, comprising such components as are commonly understood to be required to be present at or near the location of the subject(s) of the image frames captured in a photograph or video recording. More particularly, a camera includes at least a lens and a sensor. The lens and sensor are understood to be coupled to a processor, be it a video processor or a more general-purpose central processor of a multi-purpose electronic device that includes a camera and other components. In the illustrated embodiment depicted schematically in FIG. 1, in addition to the camera 101, the camera device 102 further includes the storage device 108, the processor 110, the display 112, the manual controls 116, the automatic controls 118, and the network interface 114. In other embodiments, any of the latter group of components can be remotely coupled to a camera device.

Figure 2:
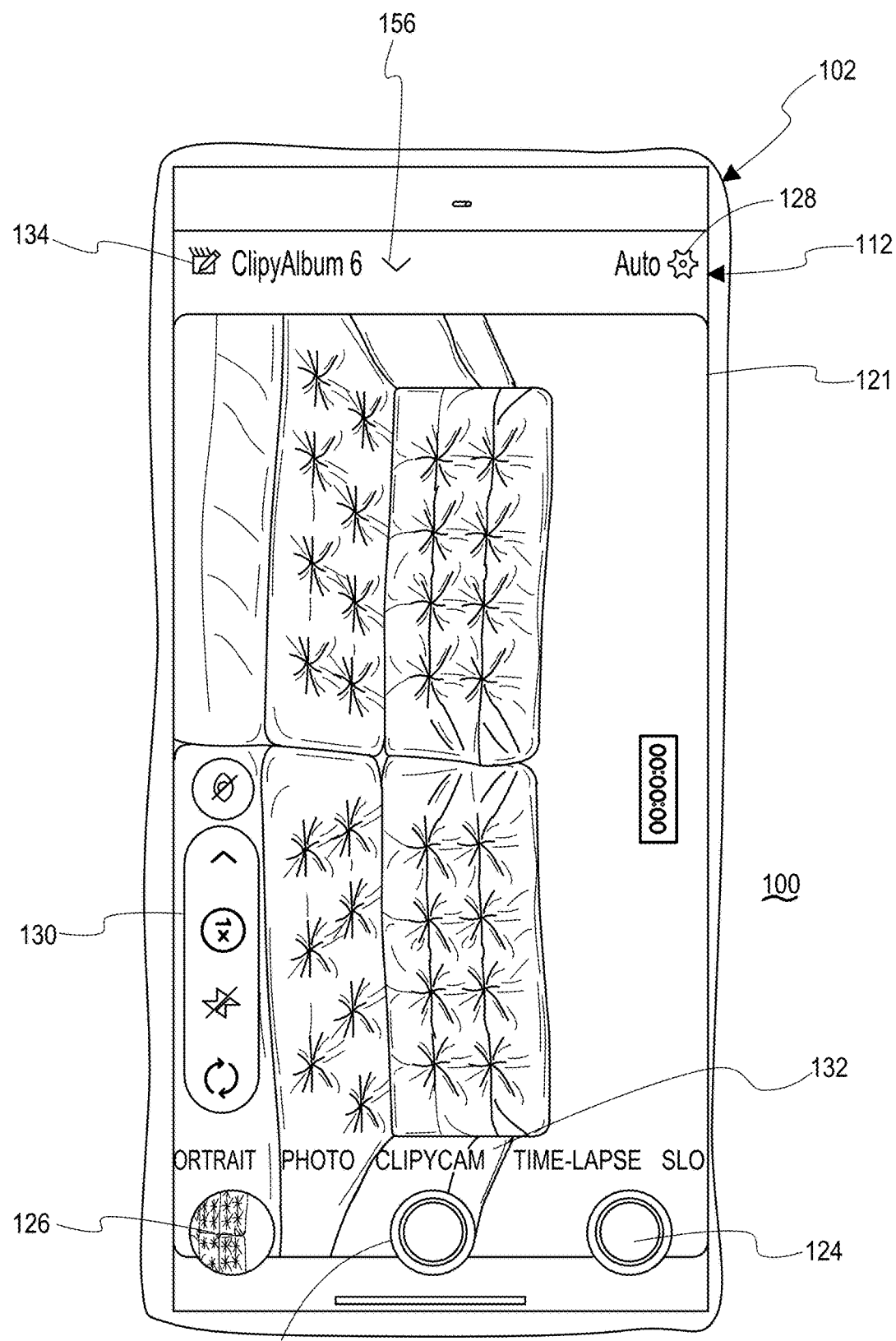
FIG. 2 is a camera mode view of a user interface for the system of FIG. 1.

Turning to FIGS. 2-11, various views or screens of an exemplary interface for the camera operator are disclosed, as displayed on the display 112 of the camera device 102, which in the illustrated embodiment is a touchscreen display. When a camera mode is activated, the interface displays in a digital viewfinder 121 a live scene captured by the camera 101. The exemplary interface also includes a number of touch controls. A record/stop control 122 (also interchangeably referred to herein as the record control 122 or the stop control 122 in applicable contexts) is shown as a "button" image in an actuatable area of the touchscreen display 112, which can toggle between displaying a standard circle symbol commonly associated with recording, when no recording is in progress, and a standard square symbol commonly associated with stopping a recording, when a recording is in progress. When the "record" circle is displayed, as in FIG. 2, a user activating the record control 122 initiates a recording, and when the "stop" square is displayed (e.g., FIGS. 5-6), a user activating the stop control 122 stops a recording and commits to storage a physical main stream of video data that was captured between the previous two activations of the record/stop control 122. It should be understood that other embodiments within the scope of the disclosed system and method can represent a record/stop control and its states in many different ways, and still others can use a dedicated record control and a separate stop control. Additional controls displayed in the exemplary interface as shown in FIG. 2 include a snap control 124, displayed as a button icon, which creates a digital still image (photo) file of the live scene when activated by a user; a file navigation link 126, displayed as a thumbnail of the most recently captured video frame or still image, which causes a file navigation or gallery interface to be displayed when activated (as shown in FIGS. 8, 9, 9A, 11, and 11A and described in more detail further below); a settings control 128, displayed as a familiar gear icon, which opens a settings menu when activated; an expandable and collapsible toolbar 130 including a number of tool selection controls represented by individual icons, as described in detail in U.S. patent application Ser. No. 18/903,435, the entire disclosure of which is hereby incorporated by reference herein; a mode-selection ribbon 132, displayed as scrollable ribbon of text, which allows a user to toggle between various camera modes, by either swiping the ribbon to the left or right until the name of the desired mode is centered in the viewfinder 121 or by tapping the name of any desired mode that appears in the window; an edit event info control 133; and a pinned album indicator 134, the latter two controls relating to an album-management aspect of the system 100 described further below.

It should be noted that systems illustrated herein can be utilized with camera systems (or smartphone, tablet, and other systems) that utilize multiple cameras or multiple lenses. For example, it is known in the art to record from multiple cameras or lenses simultaneously; for example, a wide-angle camera or lens can be used to record an entire scene (such as an entire stage), while a zoom camera or lens can be used to record the center of a scene (such as a part of the stage where the action is).

It should be noted that certain embodiments may not include all of the components illustrated in FIG. 1 and described above. For example, a "screen recorder" implementation of the disclosed recording system 100 (which could be used for teleconferencing, for example) would not require a lens, an image sensor, or a video processor. In such embodiments, the processor 110 or other suitable processor can be instructed to read each of a series of digital image data frames from a digital video data stream as the corresponding digital image frame is displayed on, or just before it is sent to, a system display (such as a computer monitor or the integrated display screen of a laptop, smartphone, or other electronic device), write the series of digital image data frames to storage as a digital video data stream, and use the digital video data stream in the same ways as described for any embodiment of the disclosure. For example, instead of reading digital image data frames from the image sensor or video processor of a camera, or from locations in the storage 108 where the video processor has written them, the processor 110 can read each digital image data frame from a graphics card (not shown) just before the frame is sent to a display. More particularly, the software of the system 100 may request the digital image data frames from a device operating system (OS), which can grant the request by allowing the processor 110 to read each digital image data frame and pass it to the system software, just before it is sent to the display. This can allow the OS to refuse to permit an app to record a screen where content with digital rights management (DRM) protections is playing. In addition, some embodiments may not require a network interface 114. Other embodiments may similarly not require other components. For example, the network interface 114 can interface directly with the video processor and even the image sensor, so that video can be directly streamed to a remote device 120 via the network interface 114. In addition, certain other components, such as a microphone for recording audio either concurrently/synchronized with or independently of video, may be present in the recording system 100 but have been omitted for brevity and clarity.

Album Management

According to an aspect of the disclosure, a software application running on the recording system 100 includes an automated album management feature as now described, with reference to exemplary user interface views shown in FIGS. 2-11. Digital media files created using the application on the recording system 100, including video recordings, still images (photos or screen captures, for example), audio recordings, are stored in the storage 108 organized into logical entities referred to as "albums." An album can contain one or more digital media files or be empty, that is, contain no digital media files. Thus, albums 136 are shown in an album listing interface view of FIG. 8 or FIG. 11 as separately labeled blocks containing a thumbnail image 138 of the most recent video frame or photograph stored in each non-empty album 136, as well as counters 140 of types of content contained in the album 136. The details of an individual album 136 are shown in an album detail interface view of FIG. 9, which can be accessed by a user tapping inside the block representing that album 136 in the album listing view of FIG. 8. The app uses a logical pointer called a "pin," which at all times is "pinned" to (points to) only one of the albums 136, referred to herein as the "pinned" album 136. Whenever a digital media file is written to the storage 108, the file is stored in whatever album 136 is pinned at the time the file is written.

Figure 8:
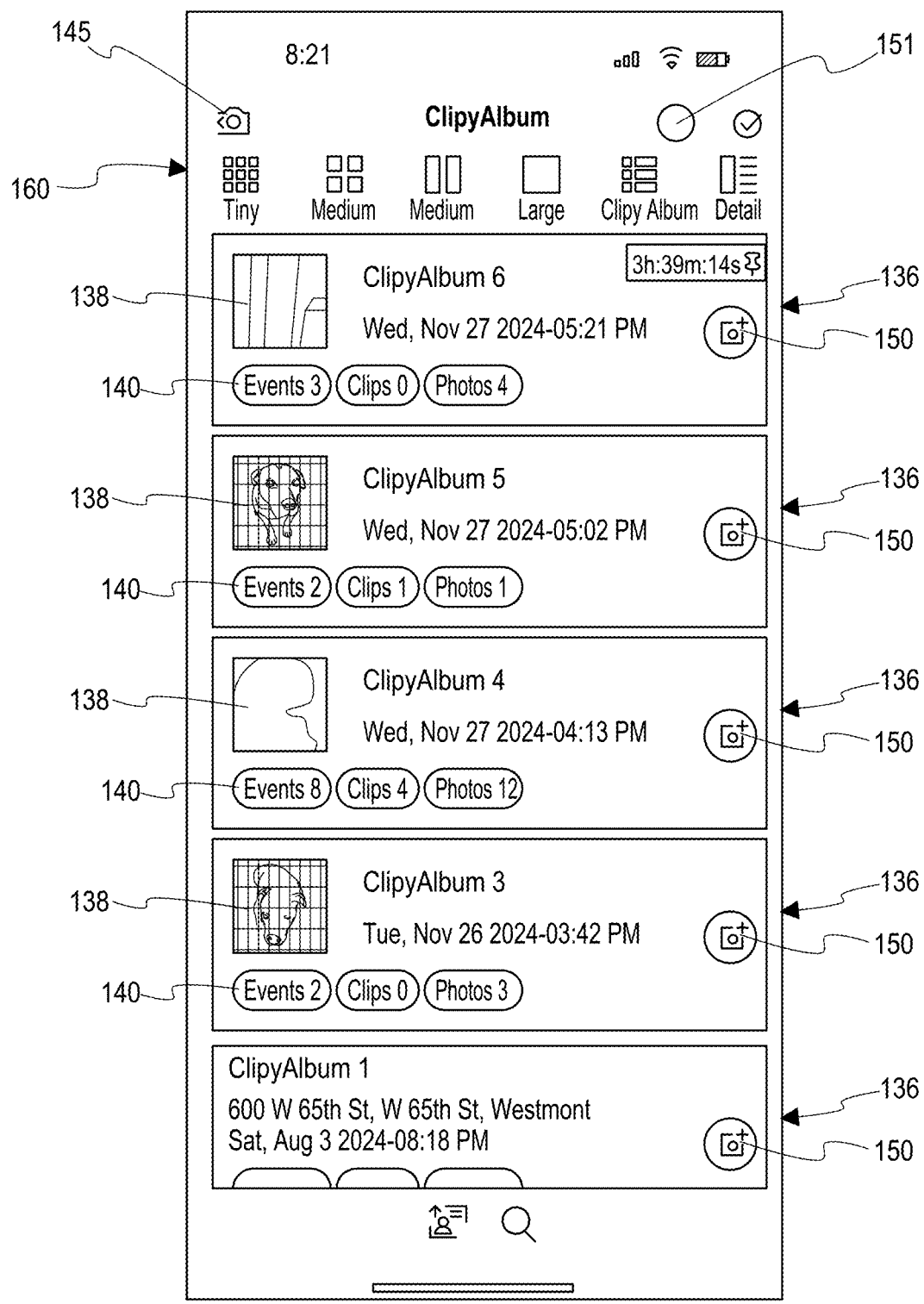
FIG. 8 is a file navigation album listing view of a user interface for the system of FIG. 1.

As shown in FIG. 8, each album 136 contains at least one "event" in which digital media files stored in the album 136 are organized into one or more subgroups. An "event" can include multiple media files, but in the illustrated embodiment, is limited to no more than one video file. In particular, the software application automatically generates a new event 142 within a currently pinned (explained below) album 136 each time a user completes a video recording, thus facilitating the separate grouping of each of a user's video recordings together with clips and snaps taken therefrom, as well as together with still photos taken during the same camera mode session, before beginning the video recording. This manner of automatically grouping clips, snaps, and photos into an event 142, which can be associated with no more than one video recording, is thought to be generally helpful for a user's file organization.

Figure 3:
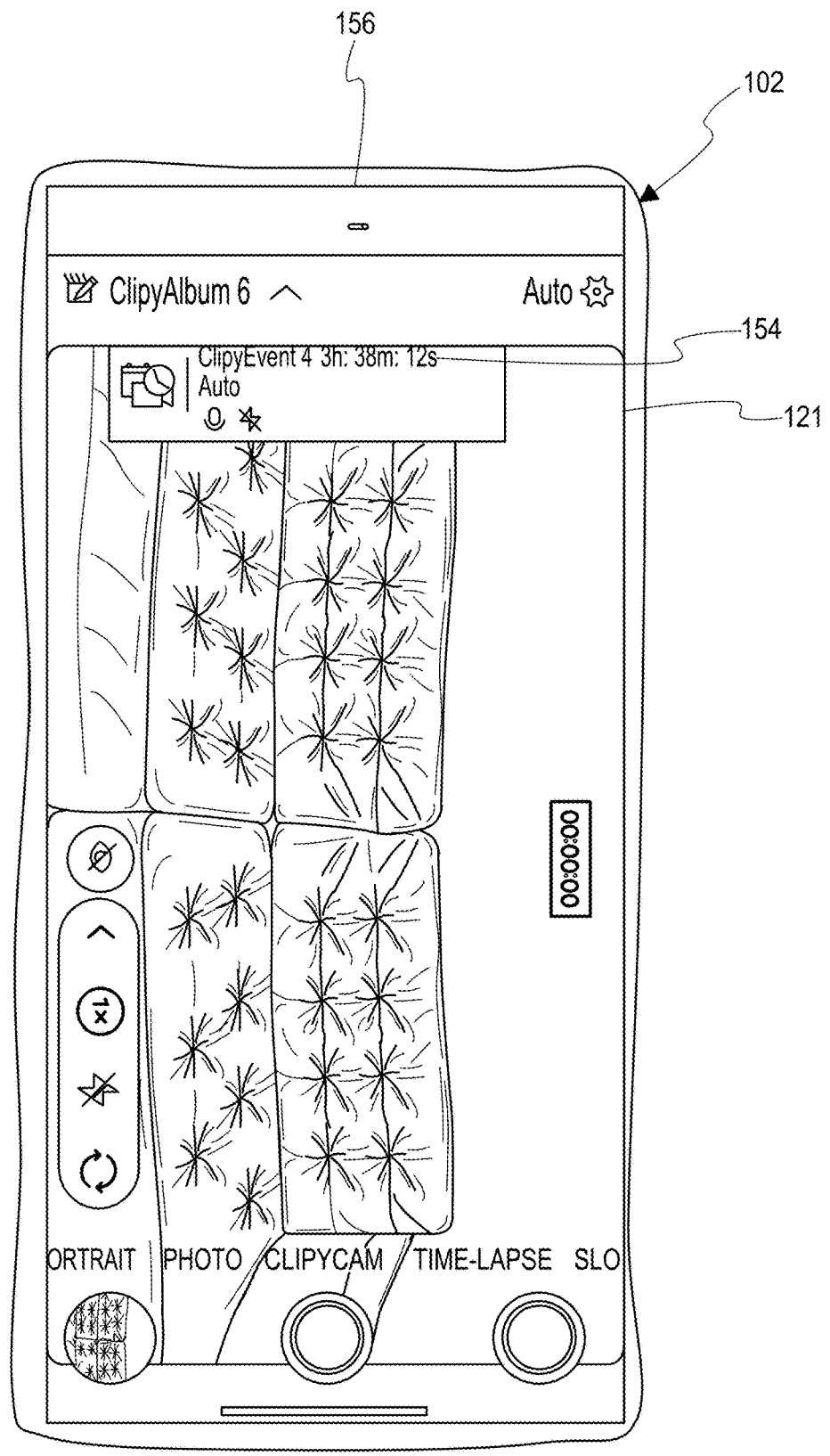
FIG. 3 is another camera mode view of a user interface for the system of FIG. 1.
Figure 6:
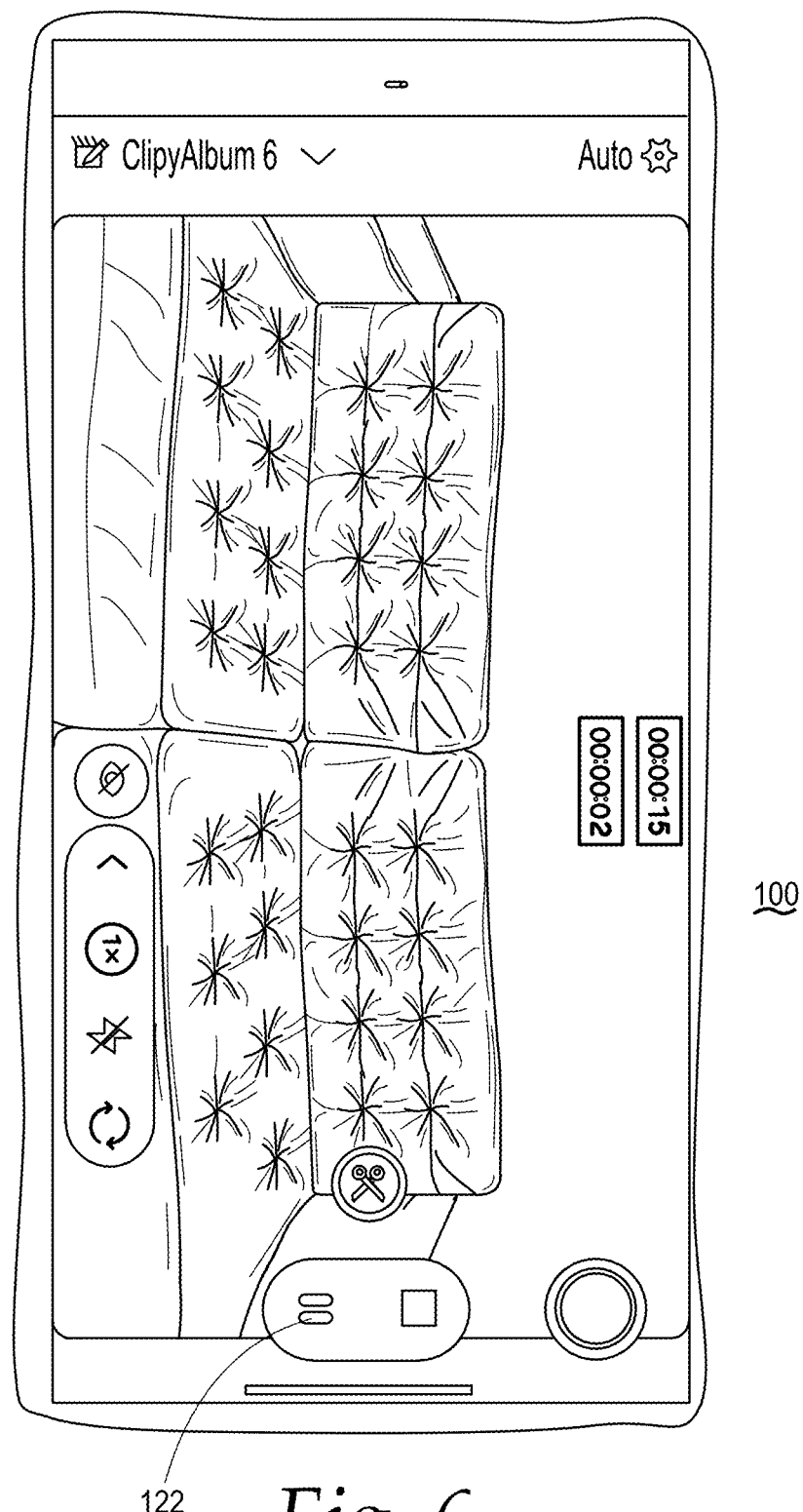
FIG. 6 is another camera mode view of a user interface for the system of FIG. 1.
Figure 7:
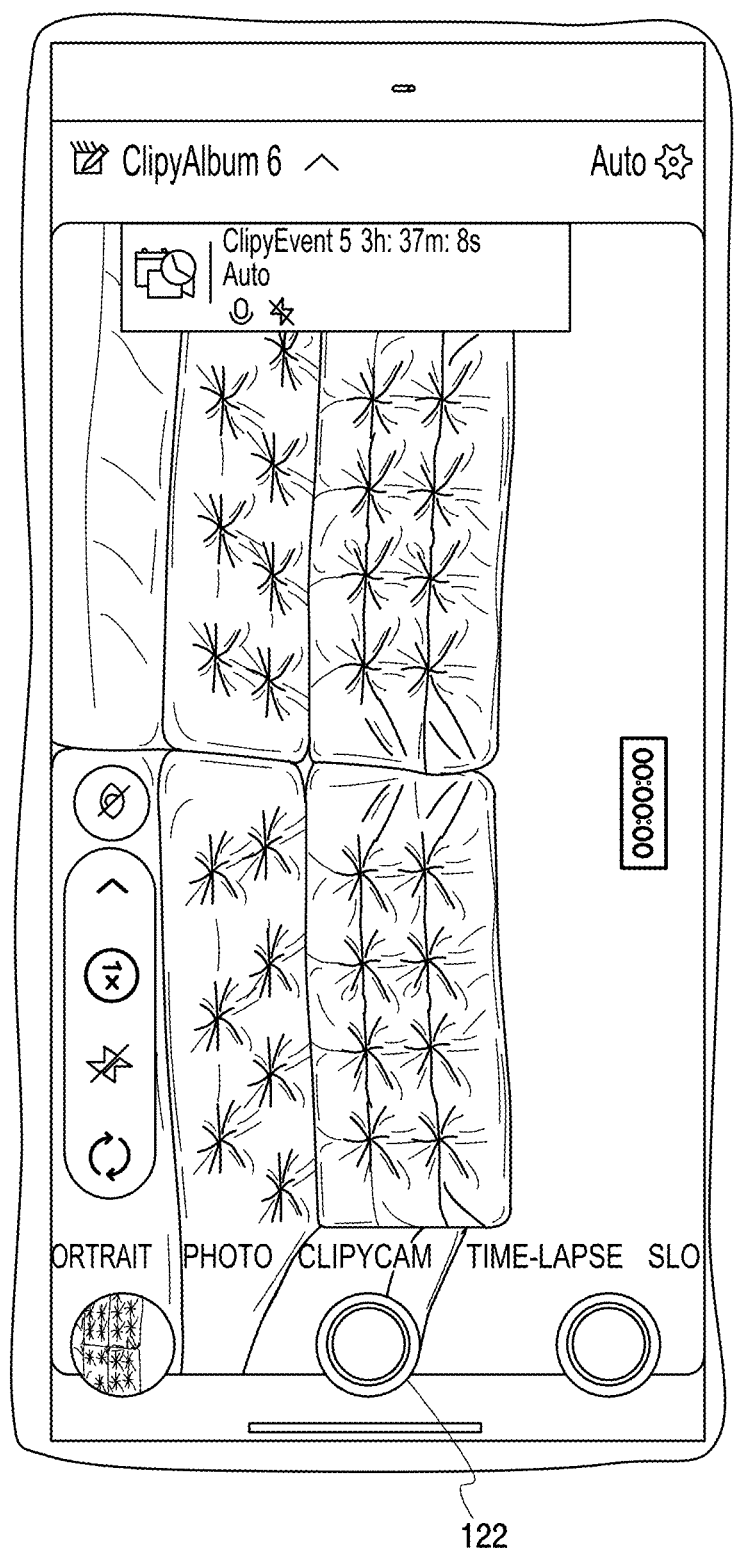
FIG. 7 is another camera mode view of a user interface for the system of FIG. 1.

In the illustrated embodiment, whenever an album 136 is pinned, more particularly, one specific event 142 of that album 136 is pinned. Which is to say, when a digital media file is written to the storage 108, it will be stored in the pinned album 136 and grouped under the pinned event 142 of that album 136. Thus, as shown in FIG. 3, the app is ready to add recorded content to a pinned event 142 called "ClipyEvent 4." A user then starts and stops a video recording using the record/stop control 122 in a sequence illustrated in FIGS. 5 and 6 (and also generates a clip from the video, as shown in FIG. 6 wherein a start/stop clip control 143 has been activated, where two seconds of clip recording time and fifteen seconds of "full video" recording time are indicated by the timers shown at the top of the viewfinder 121, shown in landscape orientation), which is then added to "ClipyEvent 4." The app then logically defines and pins a new event 142 called "ClipyEvent 5," as shown in FIG. 7. However, the queued new event ("ClipyEvent 5") will only appear in the pinned album 136, in the album detail view of FIG. 9, if and when a user has recorded content to the pinned new event 142. Otherwise, the pinned new event 142 will be discarded when the album 136 to which it pertains is no longer pinned.

Figure 11:
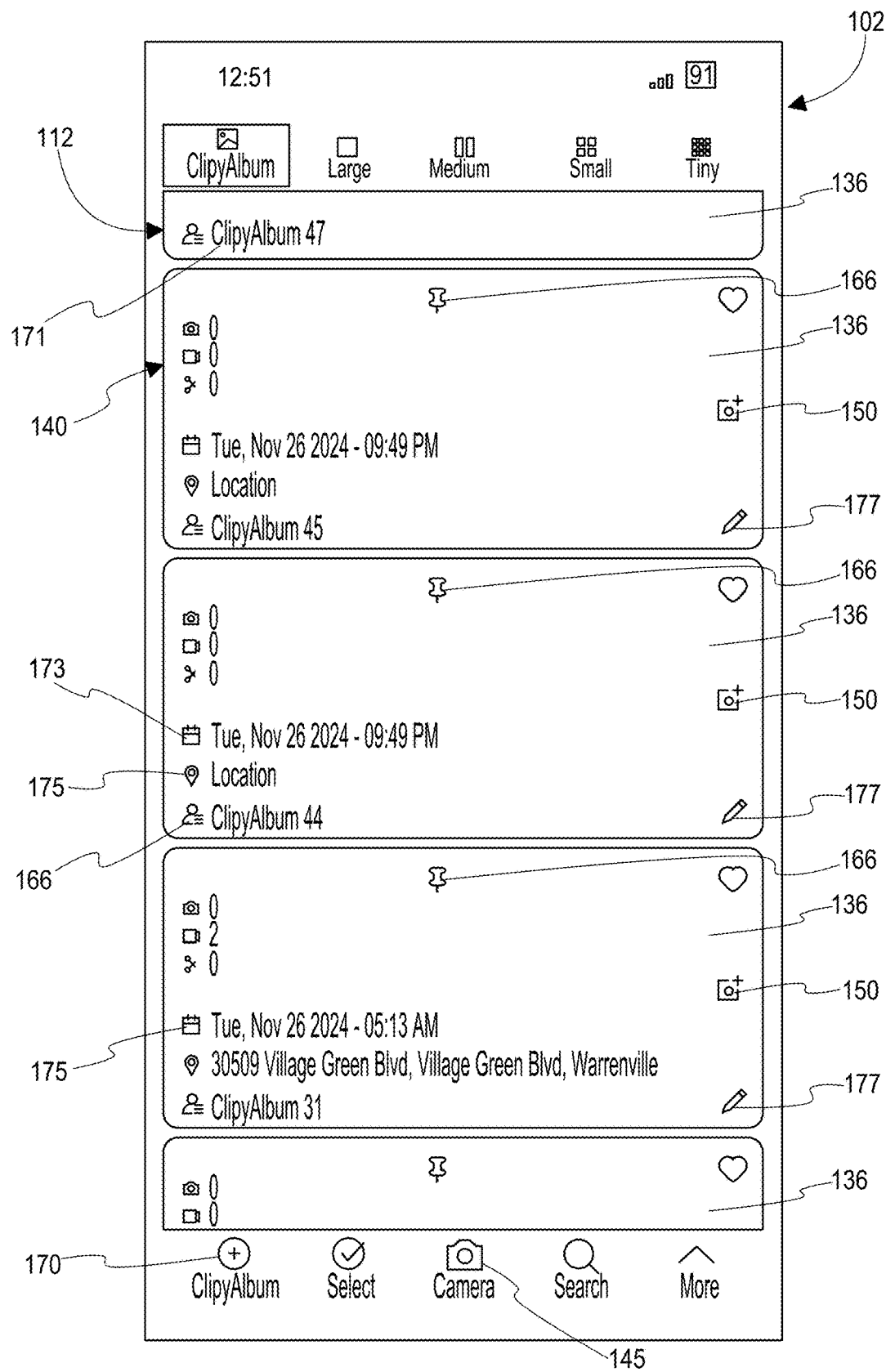
FIG. 11 is an album listing view of another embodiment of a user interface for the system of FIG. 1.

"Events" can also facilitate the grouping of files by camera mode or camera use sessions, defined as time periods during which the camera mode is continuously active. Thus, in embodiments, an empty event 142 is pinned each time a user performs certain actions that open the camera interface, such as by initially launching or reopening the app, or by activating a control within the app that activates the camera mode from a different interface of the app, such as a camera mode link 145 displayed in the file navigation/gallery interface (as shown in FIGS. 8, 11). This ensures that any content captured during a new camera session will be grouped under a new event or events 142. If no content was captured during the immediately previous session, and the pin was not moved between the previous session and the current session, then the same empty event 142 that was pinned at the end of the last session will still be pinned at the start of the current session. This event 142 will remain pinned during a session, unless and until the user records a new video, when a new, initially empty event 142 is automatically created and pinned, as explained above. On the other hand, when a user snaps one or more photos, the pinned event 142 will no longer be empty when the user leaves the camera mode, such as by closing the app or opening an album listing view using the file navigation link 126. In that case, when the user reopens the app or returns to the camera mode by activating the camera mode link 145, a new, initially empty event 142 of the pinned album 136 is logically defined and pinned.

Figure 9:
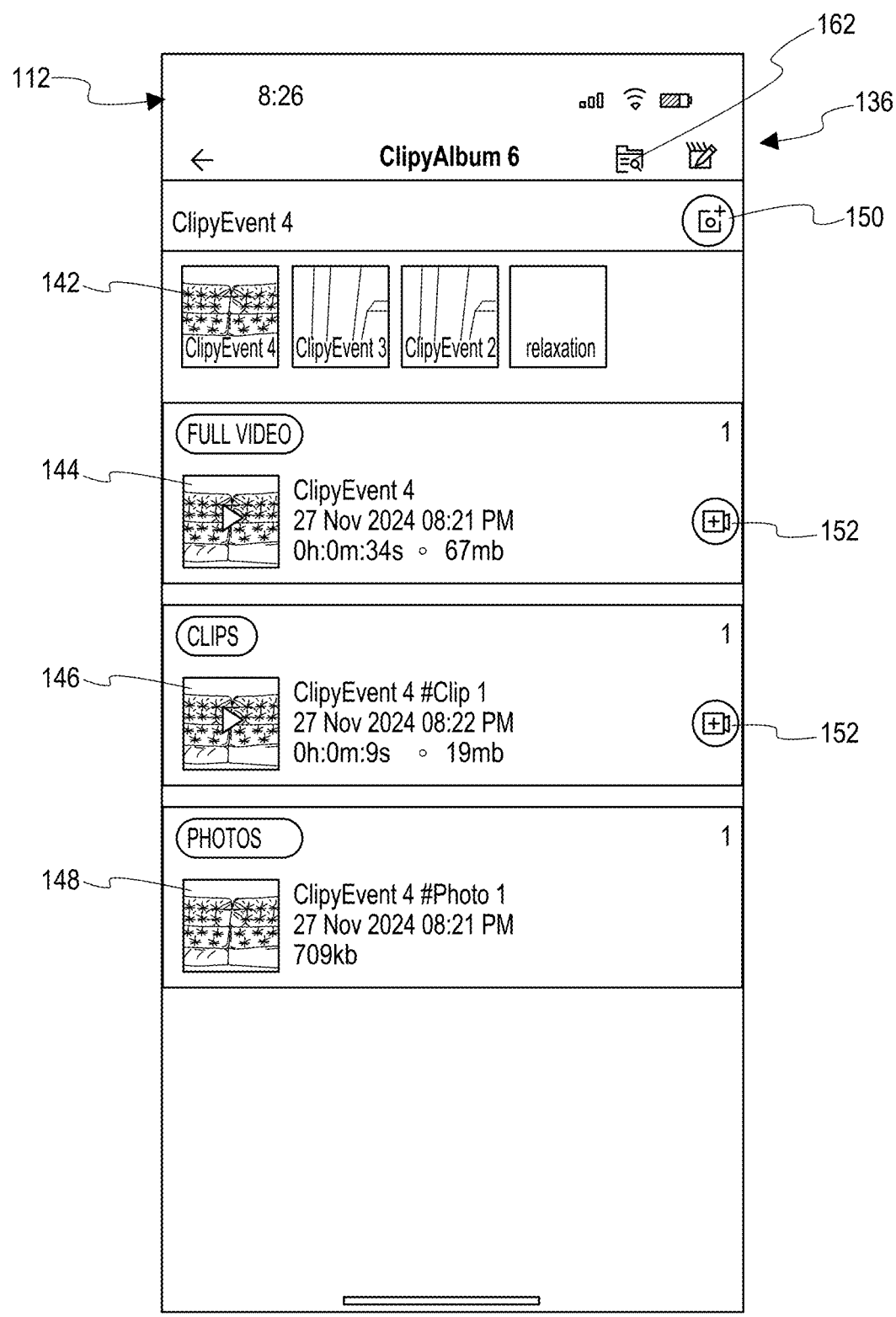
FIG. 9 is a file navigation album detail view of a user interface for the system of FIG. 1.

In the example of FIG. 9, an album 136 named "ClipyAlbum 6" includes files that are sub-grouped into four events 142, named "relaxation," and "ClipyEvent 2" through "ClipyEvent 4," thus illustrating one possible default sequential naming system for events 142, which a user can override by manually editing event information, such as by activating the edit event info control 133 shown in several of the drawings, including FIG. 2. As shown in FIG. 9, the event 142 named "ClipyEvent 4" is highlighted, and files 144-148 sub-grouped into that particular event 142 are represented in separate boxes below. These include a full video file 144 from which a clip file 146 was generated (such as by using a clip control as described in detail for the video recording systems disclosed in U.S. Pat. Nos. 11,380,359; 11,677,905; 11,818,461; 12,075,192; and 12,081,865, each of which is hereby incorporated herein by reference), and a photo file 148.

Each album 136 has an associated append or add content control 150, which is displayed both in the album listing view, as shown in FIG. 8 (and in another embodiment in FIG. 11), and in the album detail view, as shown in FIG. 9. When a user activates the add content control 150 of an album 136, a camera mode becomes activated, and the interface as in FIGS. 2-7 is again displayed, with that album 136 "pinned" (as explained below), its name being displayed in the pinned album indicator 134. Even an empty album 136 (not shown) has an associated add content control 150. An empty album 136 can be a daily album that was either manually created by a user or automatically created by the system 100 at the start of a new calendar day (automatic and manual creation of new albums are both described in more detail further below), to which the user has not yet added content.

Similarly, each video file 144, 146 has an associated continue video control 152, as shown in FIG. 9. User activation of the continue video control 152 corresponding to a video file 144, 146 has several effects. First, a "continue video" camera mode becomes activated, in which the record control 122 is operative to begin recording a new video segment to be appended to the corresponding video file 144, 146, resulting in the creation and storage of a new, merged video file when the user activates the record(/stop) control 122 a second time to stop recording the new segment. The original video file 144, 146 may either remain a separate logical and/or physical file or be deleted, based on either a prompted selection by the user or a preselected setting, which a user may select at any time by accessing settings using the settings control 128. (Attributes and functionality of a continue video control suitable for the systems and methods disclosed herein are described in more detail in U.S. Pat. No. 12,081,865.) The "continue video" camera mode can remain active until the user cancels it by selecting "Cancel" in a continue video interface view shown in FIG. 10, even overriding pin movement triggers described elsewhere in this disclosure, such as pin expiry by default at the end of a calendar day, or upon the expiration of a different, manually set pin time, and pin movement to a new empty event whenever a video recording is stopped or when a user navigates away from the camera interface or closes the app. In addition, the album 136 containing the original video file 144, 146 becomes "pinned" by the activation of the continue video control 152, if it was not already currently pinned. Thus, according to an embodiment, after a user cancels continue video mode, a new empty event 142 is created and pinned within the album 136 that contained the original video file 144, 146.

Figure 12:
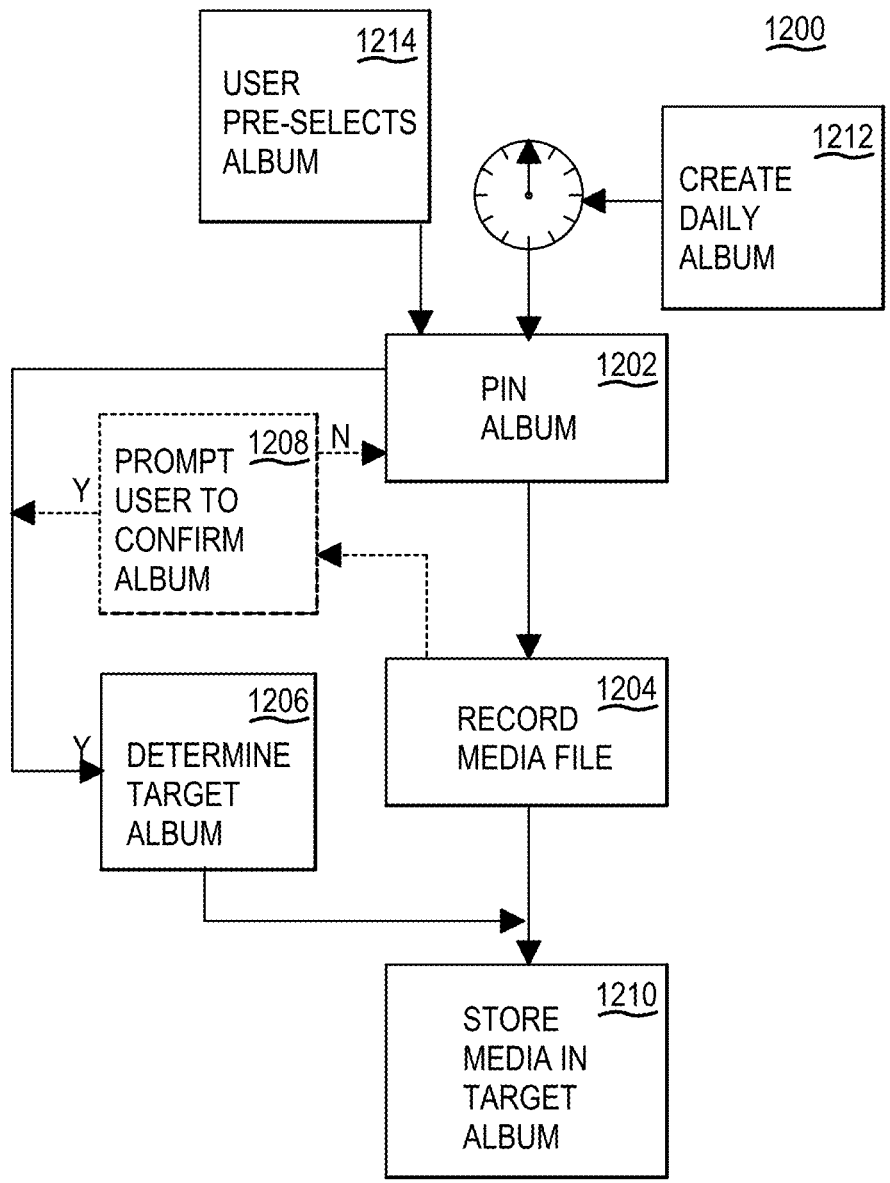
FIG. 12 is a simplified flow diagram of a method of file management using the system of FIG. 1.

Whenever a user snaps a photo using the snap control 124 or records video and/or sound using the record control 120, the media file that is thereby generated is logically stored in one of the albums 136, following a programmed procedure of the software application of the system 100, as now described. The particular album 136 into which the file is organized is determined in accordance with a method 1200 according to an embodiment illustrated in the flowchart of FIG. 12. In a step 1202, a particular album 136 is "pinned," as indicated to the user by the displayed pinned album indicator 134, as mentioned above and shown in each of FIGS. 2-7. In a step 1204, digital media is recorded by the recording system 100 and stored to available physical memory locations in the storage 108. In a step 1206, which may precede, follow, or occur concurrently with the physical recording and storage step 1204, it is determined to which album 136 a file containing the audiovisual content is or will be logically stored. In an embodiment, all files created using the application are automatically stored to the pinned album 136 without prompting, such that merely identifying the pinned album 136 constitutes the determining step 1206.

Other embodiments further include a step 1208 of prompting and receiving a prompted selection from a user of whether to save to the pinned album 136 or to a different album 136. In the case of a snapped photo, the user is prompted immediately after a user activates the snap control 124. In the case of a video or sound recording, the prompt can be presented immediately after the user activates the record control 122 to begin a new recording, or only after the user activates the stop control 122 to end a recording in progress. In either case, in response to the prompt, the user can choose to confirm the currently pinned album 136 as the save location, to create a new album 136 as the save location, or to save the new file to another existing album 136. In embodiments, when the user elects to save to a new or existing album 136 that is not currently pinned, the prompting and user selection step 1208 feeds back into the pinning step 1202 for the user-specified album 136 to be pinned. In other embodiments, the new file is saved to the user-specified album 136, while the pinned album 136 remains the same for purposes of executing the method 1200 to determine the destination album 136 of the next file to be recorded. In a final step 1210, following the completion of the file recording and target album determining steps 1204, 1206, the newly recorded media file (such as the video and photo files 144-148 represented in FIG. 9) is stored in the album 136 determined to be the target album.

Figure 9A:
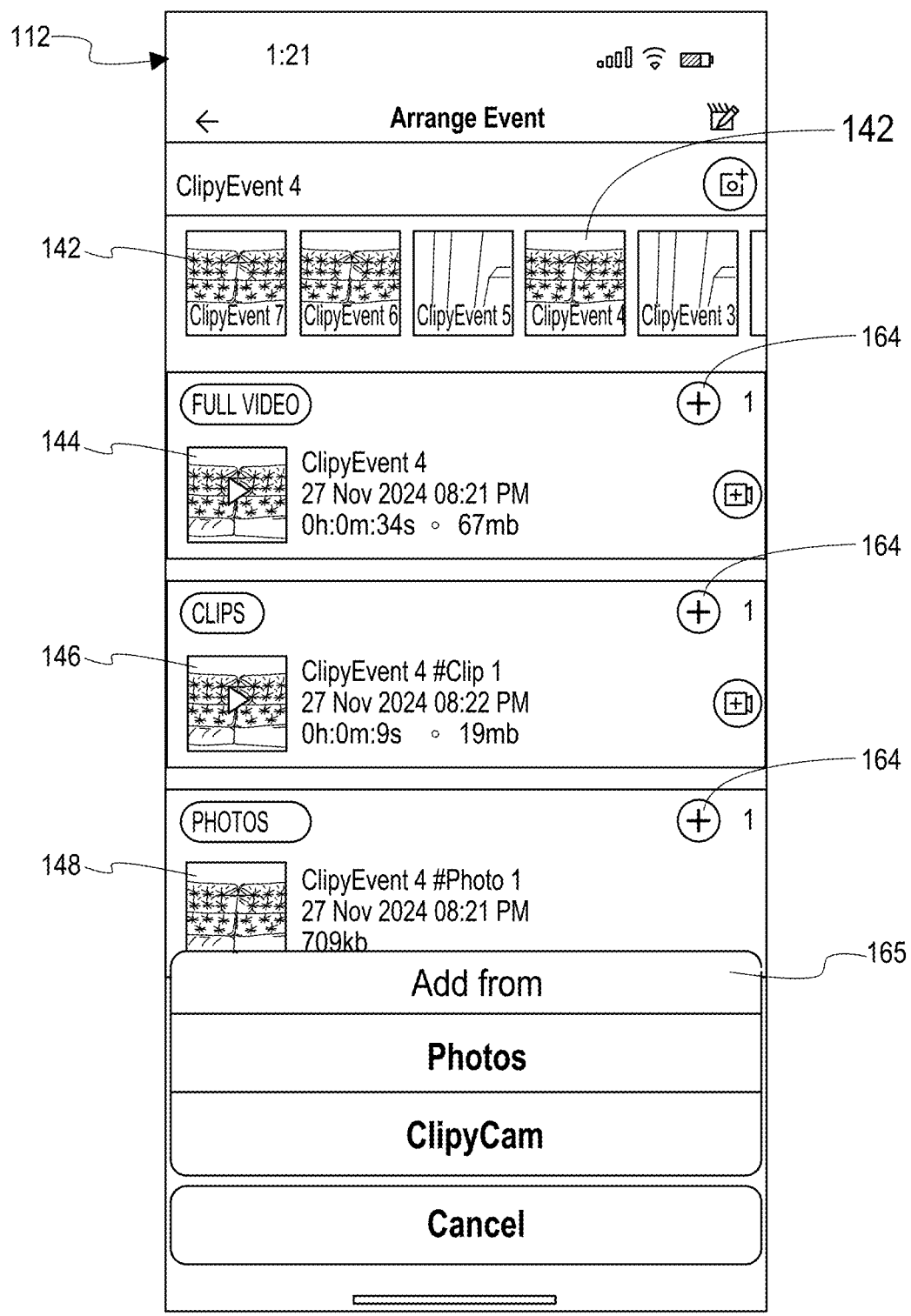
FIG. 9A is an event content import view of a user interface for the system of FIG. 1.
Figure 10:
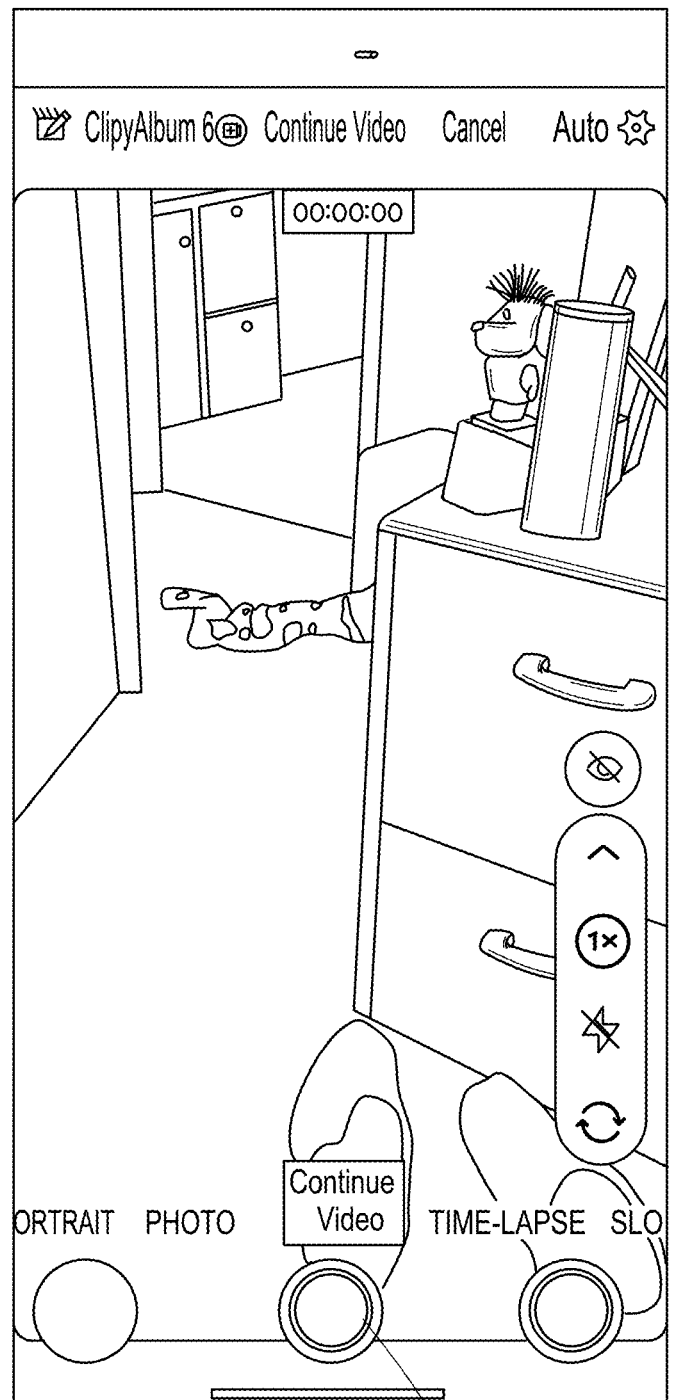
FIG. 10 is another camera mode view of a user interface for the system of FIG. 1.

Another way that a user can add content to an album 136 is by importing it. In particular, a user can open the gallery interface by selecting the file navigation link 126, select an album listing view ("ClipyAlbum") from the view selection ribbon 160 of FIG. 8, select a particular album 136 from the album listing view to open the album detail view of FIG. 9, and activate an event content edit control 162. A user is then presented an "Arrange Event" view (serving as an event content import view for importing content to an event) as shown in FIG. 9A, from which the user can select an event 142 from the selected album, for which an import content button 164 will appear for each content type, shown as "FULL VIDEO," "CLIPS," and "PHOTOS." The app will then display a source selection ("Add from") menu 165 prompting a user to import content of the selected type (clips 146 in the example shown in FIG. 9A) to the selected event 142, either from within the file system of the app (by selecting "ClipyCam") or from another file system, such as a device file system of the camera device 102 or any other file system in the (local or remote/cloud) storage 108 (by selecting "Photos"). When a user activates the import content button 164 for a full video 144, a user can be prompted to "Replace from," rather than to "Add from" one of those sources, as in the illustrated embodiment, only one full video 144 can be associated with a given event 142.

In the illustrated embodiment, the method 1200 further includes a daily album creation step 1212, in which a new daily album 136 is created automatically at the start of every calendar day. More particularly, the software application is configured to create a new daily album 136 for each user of the application and/or on each recording system 100 on which the application is running. For example, where new daily albums 136 are assigned per user, the application can be configured for a user to log in to a user account, which will connect the user's electronic device 102 to a system server, and the storage 108 can be a remote (cloud) storage device to which the server grants the user access via any electronic device 102 that the user is logged into. In addition, the method 1200 further includes a step 1214 in which a use manually selects an album 136 to be pinned, such as by activating the add content control 150 corresponding to that album 136 from interface view from FIG. 8, FIG. 9 or FIG. 11, by activating the continue video control 152 of a video file 144 or 146 contained in that album 136 from the album detail view of FIG. 9, as previously described, or by activating a pin-control 166 associated with the album, with reference to FIGS. 11-11A and described further below. The daily album creation step 1212 and the user pre-selection step 1214 independently feed into the pin album step 1202. Thus, in general, the pinned album 136 will be reassigned in the step 1202 following step 1212 or step 1214, each time either of them occurs.

Figure 4:
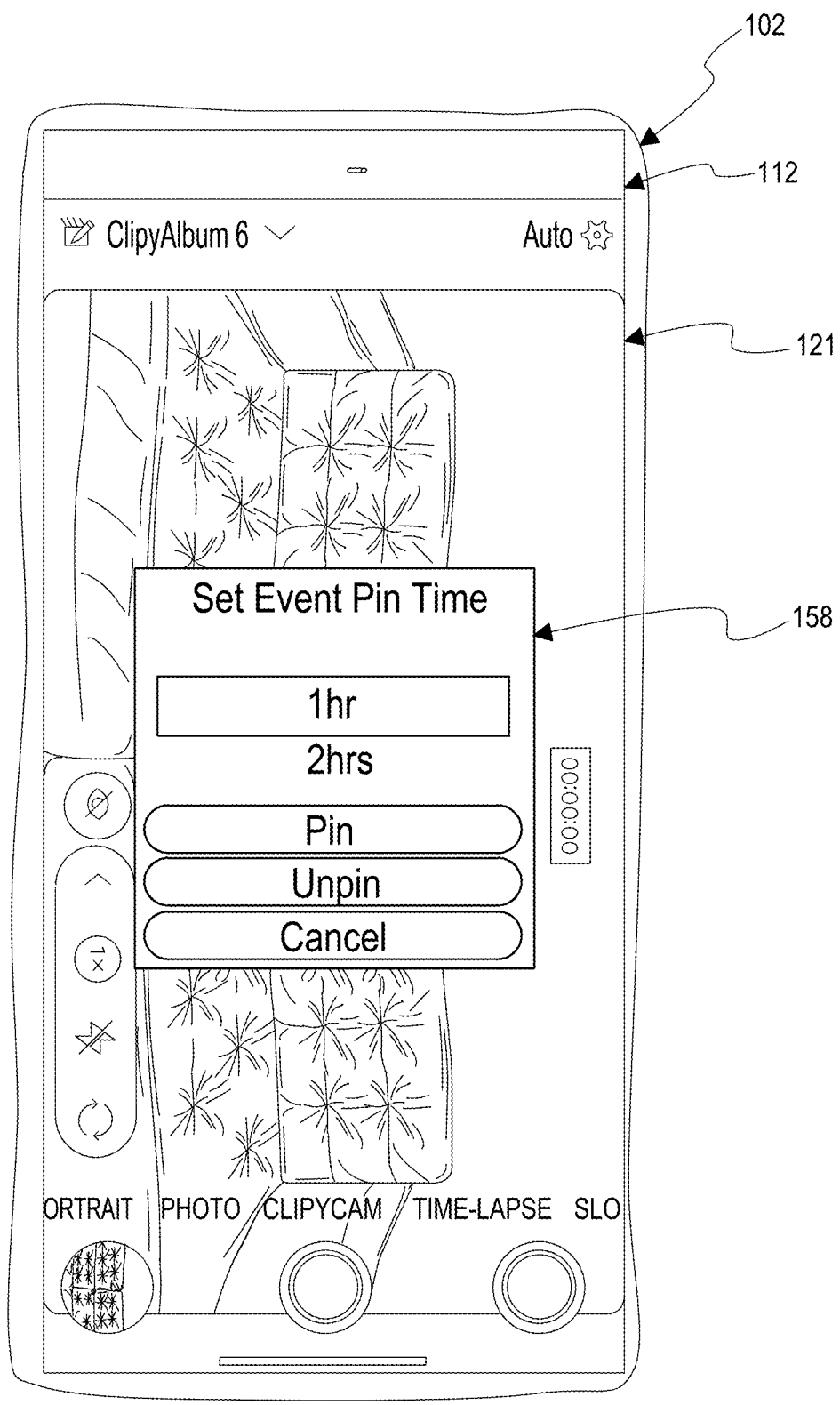
FIG. 4 is a pin time selection menu view of a user interface for the system of FIG. 1.
Figure 5:
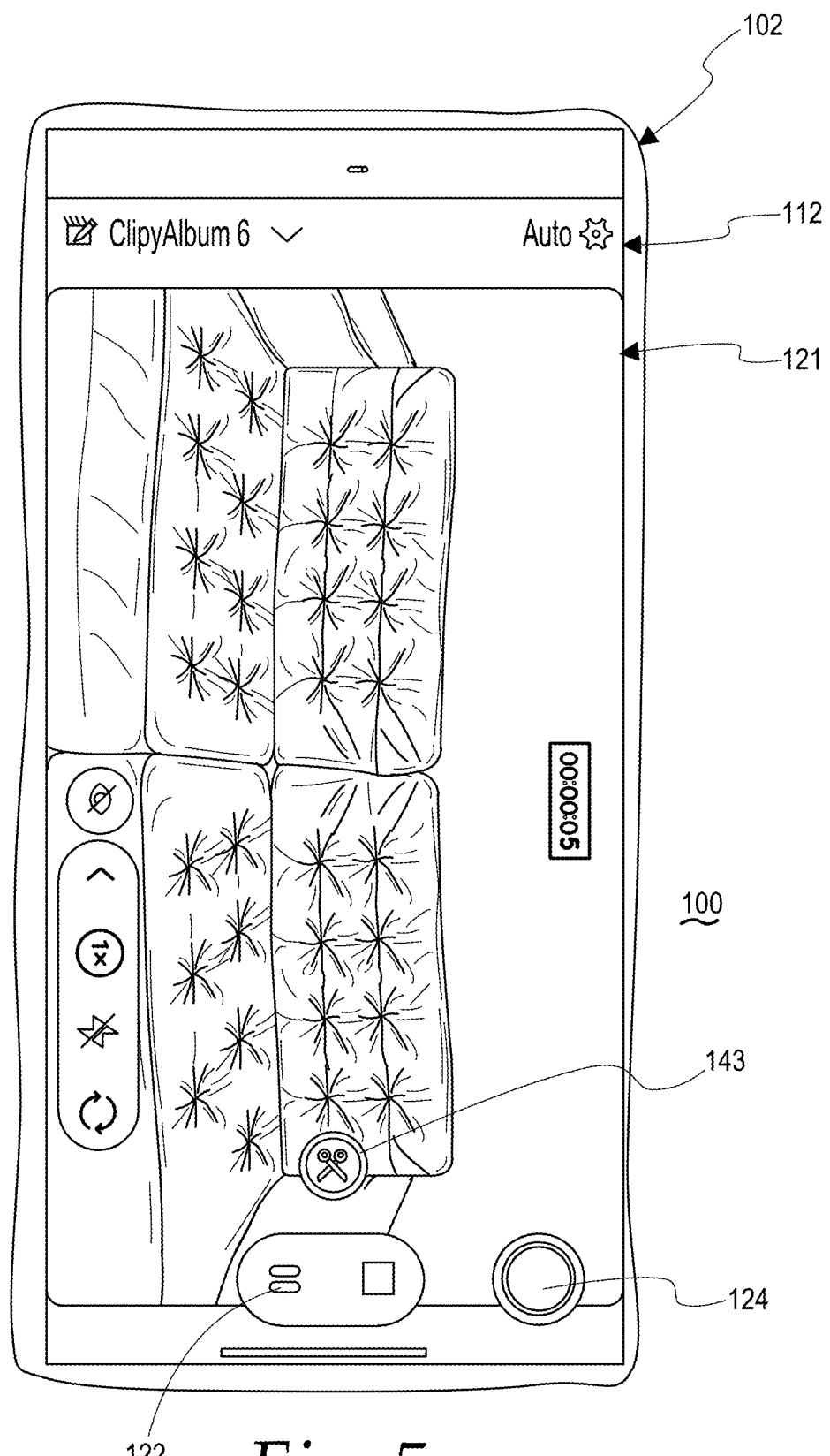
FIG. 5 is another camera mode view of a user interface for the system of FIG. 1.

However, in the illustrated embodiment, the timing of the daily album creation step 1212 can be overridden by a user setting a pin timer, with reference to FIGS. 3-4 and FIGS. 11-11A. Turning to FIG. 3, there is shown a pin timer 154 that is displayed when a user activates a dropdown control 156 associated with the pinned album indicator 134. By default, at the time that an album 136 is pinned, the associated pin timer 154 is set to expire at the end of that calendar day. However, a user can set the pin timer 154 manually by tapping the pin timer 154 or an associated control icon or area, to bring up a set pin time panel 158 as shown in FIG. 4, and interacting with the panel 158 to select and confirm a pin time.

Figure 11A:
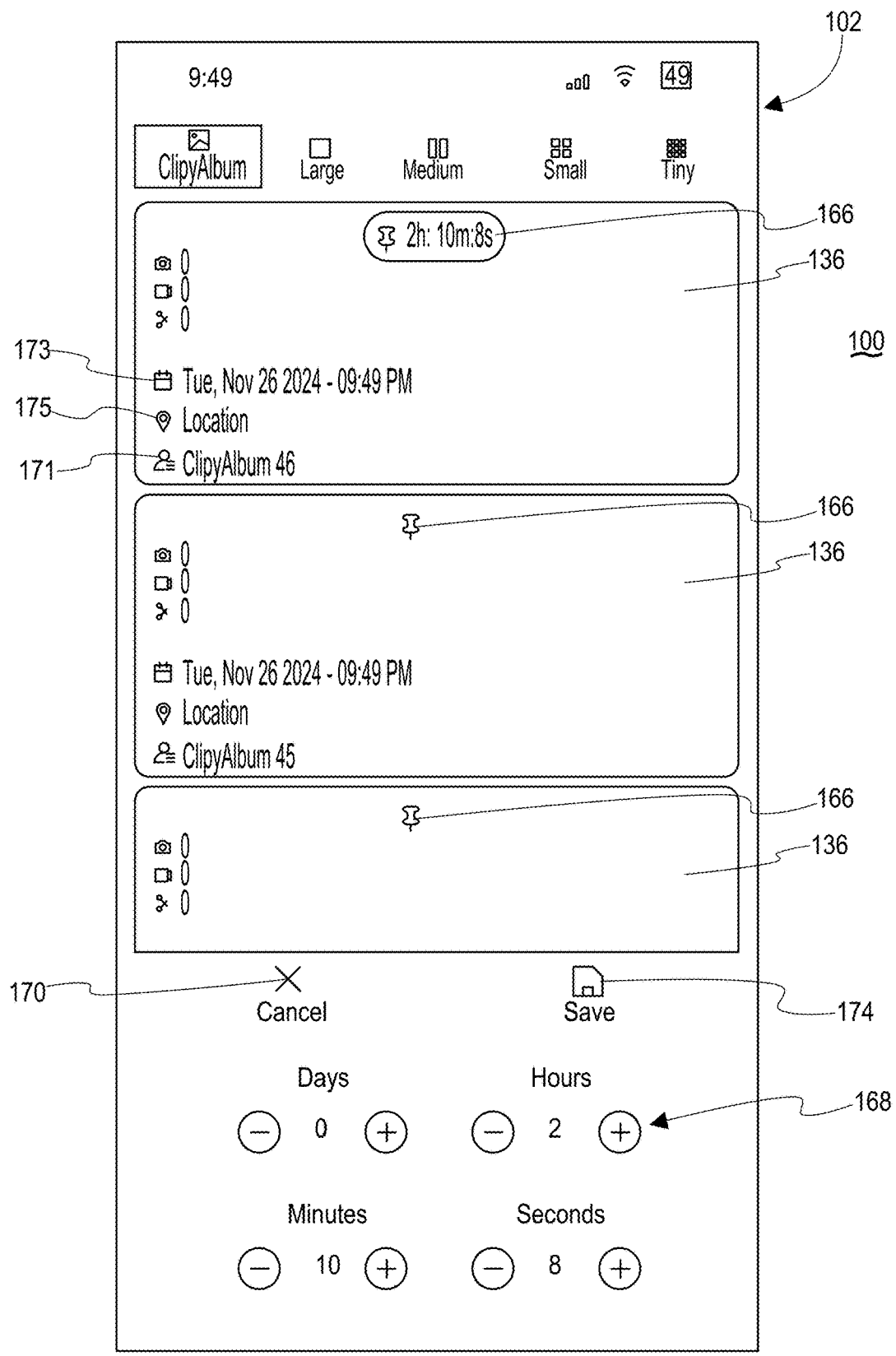
FIG. 11A is an album listing and pin time selection panel view of a user interface for the system of FIG. 1 embodied as in FIG. 11.

Alternatively or additionally, a pin time can be set by a user activating the file navigation link 126 and opening an album detail interface view according to another embodiment as shown in FIG. 11, wherein each existing album 136 is displayed with an associated pin control 166, which a user can activate to open a set pin time panel 168, as shown in FIG. 11A, according to another embodiment, allowing the user to specify a pin time in days, minutes, hours, and seconds.

In an "exception to the exception" according to embodiments, the app can be programmed so that a pin time currently set to expire for a pinned album 136 before the end of a day is automatically extended whenever a user activates the continue video control 152 of a video file 144 or 146 contained in an event 142 of the album 136. For example, the pin time for the album 136 that contains the corresponding video file 144 or 146 can be extended to the end-of-day default, or until the user has canceled the current "continue video" activation by selecting "cancel" in the "continue video" interface view shown in FIG. 10. In some embodiments, "continue video" mode will remain active until manually canceled by the user, regardless of manual or default album pin expiration times, as well as regardless of other actions or inputs that would otherwise result in the pinning of a new empty event as described above. This exception to the exception can prevent the continue video mode from being deactivated before a user is finished appending new video segments to the video file 144 when activating the record control 122, requiring the user to navigate back to the video file 144 and reactivate its continue video control 152 in order to resume appending new segments.

Also illustrated in FIG. 11 are controls for creating a new album 136, pinning an album 136, and editing the metadata or properties of an album 136. When a user activates an add album control 170, a new album 136 is created with default editable properties including an album name property 171, a date-time property 173, and a location property 175 (in embodiments, an album can have more, fewer, and/or different editable properties). More particularly, the new album 136 can appear as shown at the top of FIG. 11A, for which the name property 171 is a default sequential value in a default format, illustrated as "ClipyAlbum 46," the date-time property 173 is set to the current time read from a clock utility of the camera device 102, and the location property 175 can either be unspecified or a current location detected by a GPS system of the camera device 102. The new album 136 is pinned by default upon its creation until the end of the current day as indicated adjacent its corresponding pin control 166. A user can then modify the pin time, if and as desired, in the panel 168. When a user thus manually sets a pin time that will expire before the end of the current calendar day, a new empty album 136 is automatically created and pinned upon the expiration of the manually set pin time, as in the step 1212 of creating a new daily album. On the other hand, when a user manually sets a pin time that will not expire until after the end of the current calendar day, the daily album creation step 1212 is deferred until the expiration of the manually set pin time. A user can cancel manually setting the pin time by activating a cancel control 172 or save the pin time selected in the set pin time panel 168 by activating a save control 174. Activation of either the cancel control 172 or the save control 174 returns the interface to the album listing view as shown in FIG. 11, wherein a user can then edit the metadata or properties 171-175 of the newly created album 136 or any other album 136, by activating a corresponding album edit control 177.

According to another album management aspect of the present disclosure, the application software is programmed so that certain conditions trigger the automatic deletion of empty albums 136.

First, whenever a user empties an album 136 by removing every file 144-148 contained in that album 136, the album 136 will be deleted automatically. In embodiments, such automatic album deletion only occurs subject to one or more additional conditions. For example, one such additional condition is that an empty album will only be deleted automatically if the user has also made no changes to any of an album's default metadata or properties, such as an album name, associated location(s), or associated date(s). A user can also be notified by a displayed message (not shown) whenever an empty album 136 is deleted.

Second, any empty album(s) 136, are automatically deleted at the end of each calendar day (again, in embodiments, excepting any empty album(s) 136 with user-modified metadata or properties). This includes the daily album 136 that was automatically created at the start of the day, in addition to any album(s) 136 created manually by the user during the day, to which the user has not added content by the end of the day.

A user has at least three ways of creating a new album 136, or causing one to be created, during a given calendar day (i.e., at times other than 12:00 am on that or the following day).

A first way is for the user to activate the add album control 151 displayed in the album listing view of FIG. 8.

A second way is for the user to "unpin" a currently pinned, non-empty album, by activating a dropdown control 156 from a camera mode view as shown in FIG. 2 to bring up a pin timer 154 as shown in FIG. 3, selecting the pin timer 154 to bring up a set pin time panel 158 as shown in FIG. 4, and selecting "unpin" from the set pin time panel 158. In response to the user selecting "unpin," the app automatically generates and pins a new empty album 136 in place of the previously pinned album 136, while removing the latter as the pinned album. The previously pinned album 136 is not deleted; the logical entity and its contents remain accessible by activating the file system navigation control 126 and selecting an album view (denoted "ClipyAlbum," and highlighted as the selected view, in a view selection ribbon 160 shown in FIG. 8), but is no longer the current album 136 to which new media files are saved as they are created.

A third way is for the user to open the pin time panel 158 and set a pin time that will expire at any other clock time than midnight, resulting in a scheduled unpinning of a currently pinned album 136 upon the expiration of the pin time, in response to which the app automatically generates a new empty album 136 just as it does in the case just described of the user manually unpinning the album 136 in real time. However, in either case, if a currently pinned album 136 was never used to store content (or otherwise modified by a user, such as by applying a descriptive name in anticipation of capturing particular subject matter during the pin time), then currently pinned album 136 remains pinned, no new album 136 is created, and the app takes no action when the pin time expires or a user attempts to unpin the album. The app can be programmed to ignore such a manual request with or without notifying the user, as the result of taking no action, an empty album 136 having default properties (name and other, if any) remaining pinned, is essentially the result the user expects to attain by unpinning the album 136.

General Notes on the Disclosure

Although the process-flow diagrams of this disclosure show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

Throughout this disclosure, streams and clips are generally described as audiovisual streams and clips. However, it should be understood that the principles described herein can be applied to streams and clips of purely audio or purely video.

In the preceding description of various examples of embodiments of the disclosed systems and methods, reference is made to the accompanying drawings, which form a part hereof, and in which are shown by way of illustration various example devices, systems, and environments in which aspects of the disclosed system and method can be practiced. Other specific arrangements of parts, example devices, systems, and environments, can be used, and structural modifications and functional modifications can be made without departing from the scope of the disclosed system and method.

The preceding description of the disclosure has been presented for purposes of illustration and description and is not intended to be exhaustive or to limit the disclosure to the precise form disclosed. The description was selected to best explain the principles of the present teachings and the practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification but be defined by the claim(s) set forth below. In addition, although narrow claims may be presented below, it should be recognized that the scope of this disclosure is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional disclosures are not dedicated to the public and the right to file one or more applications to claim such additional disclosures is reserved.

What is claimed is:

1. A digital media file recording and organization system comprising:
   a recording component, the recording component being operative to record audiovisual content comprising at least one of images and sound, to generate digital media data from the recorded audiovisual content, the digital media data comprising at least one of digital image data representing recorded images and digital audio data representing recorded sound;
   a processor, the processor being operatively connected to the recording component to read the digital media data from the recording component;
   a storage, the storage comprising a non-volatile computer-readable medium adapted and configured to store a plurality of digital media files, each digital media file comprising at least a portion of the digital media data read from the recording component, the processor being operatively connected to the storage to write the digital media files to the storage and to read the digital media files from the storage;
   a software application, the software application comprising computer readable instructions stored in the storage, the processor being operative to read and execute the instructions from the storage;
   a display, the processor being operatively connected to the display, the software application including instructions for the processor to display a user interface on the display, the user interface comprising interactive user interface views, the display comprising a touchscreen, the touchscreen being operative to detect user touch inputs and to generate user input data from the user touch inputs, the processor being operatively connected to the touchscreen to read the user input data from the touchscreen;
   the software application including instructions for the processor to display a recording interface on the display, the recording interface comprising a record control and a file navigation link;
   the software application including instructions for the processor to:
   activate the recording component to begin recording said audiovisual content to generate said digital media data when the record control is activated a first time by a user touch input on the touchscreen, and when the record control is so activated a second time, stop said recording and write to the storage a digital media file containing the digital media data generated during said recording;
   display a file navigation interface on the display when the file navigation link is activated, the file navigation interface including at least an album listing view, the album listing view displaying a plurality of album areas representing a corresponding plurality of albums, each of the albums being a logical entity stored in the storage, the logical entity being configured to logically contain zero or more of the digital media files stored in the storage, an album that logically contains zero digital media files being an empty album;
   when an album is made empty by removing at least one digital media file previously contained in the album so that the album contains no digital media files, determine whether the empty album qualifies for deletion under an empty album deletion rule, and delete the empty album when the empty album qualifies for deletion;
   each of the albums having at least one user-modifiable property, each user-modifiable property having a default initial value, wherein an empty album does not qualify for deletion under the empty album deletion rule if a value of any user-modifiable property of the empty album is modified from the default initial value.

2. The system of claim 1 wherein the software application further includes instructions for the processor to, at the end of a regular time interval, determine whether each of the albums is an empty album, and for each empty album, whether the empty album qualifies for deletion under the empty album deletion rule, and delete the empty album when the empty album qualifies for deletion.

3. The system of claim 2 wherein the regular time interval is a calendar day.

* * * * *